United States Patent
Vaknin

(10) Patent No.: US 11,886,705 B2
(45) Date of Patent: *Jan. 30, 2024

(54) SYSTEM AND METHOD FOR USING FREE SPACE TO IMPROVE ERASURE CODE LOCALITY

(71) Applicant: Vast Data LTD., New York, NY (US)

(72) Inventor: Yogev Vaknin, Karkur (IL)

(73) Assignee: VAST DATA LTD., Tel Aviv (IL)

( * ) Notice: Subject to any disclaimer, the term of this patent is extended or adjusted under 35 U.S.C. 154(b) by 242 days.

This patent is subject to a terminal disclaimer.

(21) Appl. No.: 17/503,861

(22) Filed: Oct. 18, 2021

(65) Prior Publication Data

US 2022/0035532 A1 Feb. 3, 2022

Related U.S. Application Data

(63) Continuation of application No. 16/401,691, filed on May 2, 2019, now Pat. No. 11,150,805.

(51) Int. Cl.
*G06F 3/06* (2006.01)

(52) U.S. Cl.
CPC ............ *G06F 3/0608* (2013.01); *G06F 3/067* (2013.01); *G06F 3/0631* (2013.01)

(58) Field of Classification Search
CPC ....... G06F 3/0608; G06F 3/0631; G06F 3/067
See application file for complete search history.

(56) References Cited

U.S. PATENT DOCUMENTS

| | | | |
|---|---|---|---|
| 2005/0273686 A1 | 12/2005 | Turner et al. | |
| 2006/0179143 A1 | 8/2006 | Walker et al. | |
| 2011/0213928 A1 | 9/2011 | Grube et al. | |
| 2017/0149890 A1 | 5/2017 | Shamis et al. | |
| 2019/0310916 A1* | 10/2019 | Patel | ............... G06F 3/0619 |
| 2020/0241960 A1 | 7/2020 | Yanovsky et al. | |

OTHER PUBLICATIONS

Huang et al., "Pyramid Codes: Flexible Schemes to Trade Space for Access Efficiency in Reliable Data Storage Systems", ACM Transactions on Storage, vol. 9, No. 1, Article 3, Mar. 2013, pp. 3-3:28.
Plank, et.al., "A Complete Treatment of Software Implementations of Finite Field Arithmetic for Erasure Coding Applications", University of Tennessee Technical Report UT-CS-13-717, Oct. 14, 2013, pp. 1-36.

* cited by examiner

*Primary Examiner* — Baboucarr Faal
(74) *Attorney, Agent, or Firm* — M&B IP Analysts, LLC

(57) ABSTRACT

A system and method for using free space for recovering erasure coding data sets. The method includes segmenting at least one erasure coding data set into at least one stripe based on an erasure coding scheme, wherein each erasure coding data set includes chunks, wherein the chunks include chunks of systematic data and chunks of parity data; distributing the at least one stripe across non-volatile memory nodes based on the erasure coding scheme, wherein each non-volatile memory node is a unit of a non-volatile storage device; and upon a first failure of one of the non-volatile memory nodes: detecting that at least one of the non-volatile memory nodes that is not failed includes a first free space that does not currently store user data; and performing a first recovery process for recovering a first portion of the at least one erasure coding data set, based on the first free space.

11 Claims, 3 Drawing Sheets

SYSTEM AND METHOD FOR USING FREE SPACE TO IMPROVE ERASURE CODE LOCALITY

CROSS-REFERENCE TO RELATED APPLICATIONS

This application is a continuation of U.S. patent application Ser. No. 16/401,691 filed on May 2, 2019, now allowed, the contents of which are hereby incorporated by reference.

TECHNICAL FIELD

The present disclosure relates generally to erasure coding, and more specifically to techniques for improving erasure code locality.

BACKGROUND

Erasure code is a forward error correction code used to control errors for erasures in storage systems. Erasure coding involves transforming an original message split into k chunks into a transformed message having n chunks (where n>k) such that the original message can be recovered from a subset of the transformed message. A systematic erasure code is an erasure code in which the input original message is embedded into the encoded transformed message. The transformed messages include redundant portions of parity data stored across different storage locations that may be used for recovering lost data. A maximum distance separable (MDS) erasure code has the property that any k out of the n symbols is sufficient to recover the original message.

One property of erasure coding schemes is locality. Locality indicates the number of nodes (i.e., discrete portions of storage) that are needed to recover a lost node. Thus, for an erasure code with block locality t, at most t blocks are required to recover a lost block. The time to repair lost blocks is inversely proportional to the value of the locality t such that lower values of t result in faster repairs.

Erasure coding techniques have evolved as storage systems have evolved. In particular, the advent of distributed storage systems has resulted in the development of new erasure coding techniques. As distributed storage systems become more important, further improvements in erasure coding are desired.

It would therefore be advantageous to provide a solution that would provide improved erasure coding techniques.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for using free space for recovering erasure coding data sets. The method comprises: segmenting at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data; distributing the at least one stripe across a plurality of non-volatile memory nodes based on the erasure coding scheme, wherein each non-volatile memory node is a unit of a non-volatile storage device; and upon a first failure of one of the non-volatile memory nodes: detecting that at least one of the non-volatile memory nodes that is not failed includes a first free space that does not currently store user data; and performing a first recovery process for recovering a first portion of the at least one erasure coding data set, based on the first free space.

Certain embodiments disclosed herein also include a non-transitory computer readable medium having stored thereon causing a processing circuitry to execute a process, the process comprising: segmenting at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data; distributing the at least one stripe across a plurality of non-volatile memory nodes based on the erasure coding scheme, wherein each non-volatile memory node is a unit of a non-volatile storage device; and upon a first failure of one of the non-volatile memory nodes: detecting that at least one of the non-volatile memory nodes that is not failed includes a first free space that does not currently store user data; and performing a first recovery process for recovering a first portion of the at least one erasure coding data set, based on the first free space.

Certain embodiments disclosed herein also include a system for using free space for recovering erasure coding data sets. The system comprises: a processing circuitry; and a memory, the memory containing instructions that, when executed by the processing circuitry, configure the system to: segmenting at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data; distributing the at least one stripe across a plurality of non-volatile memory nodes based on the erasure coding scheme, wherein each non-volatile memory node is a unit of a non-volatile storage device; and upon a first failure of one of the non-volatile memory nodes: detecting that at least one of the non-volatile memory nodes that is not failed includes a first free space that does not currently store user data; and performing a first recovery process for recovering a first portion of the at least one erasure coding data set, based on the first free space.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
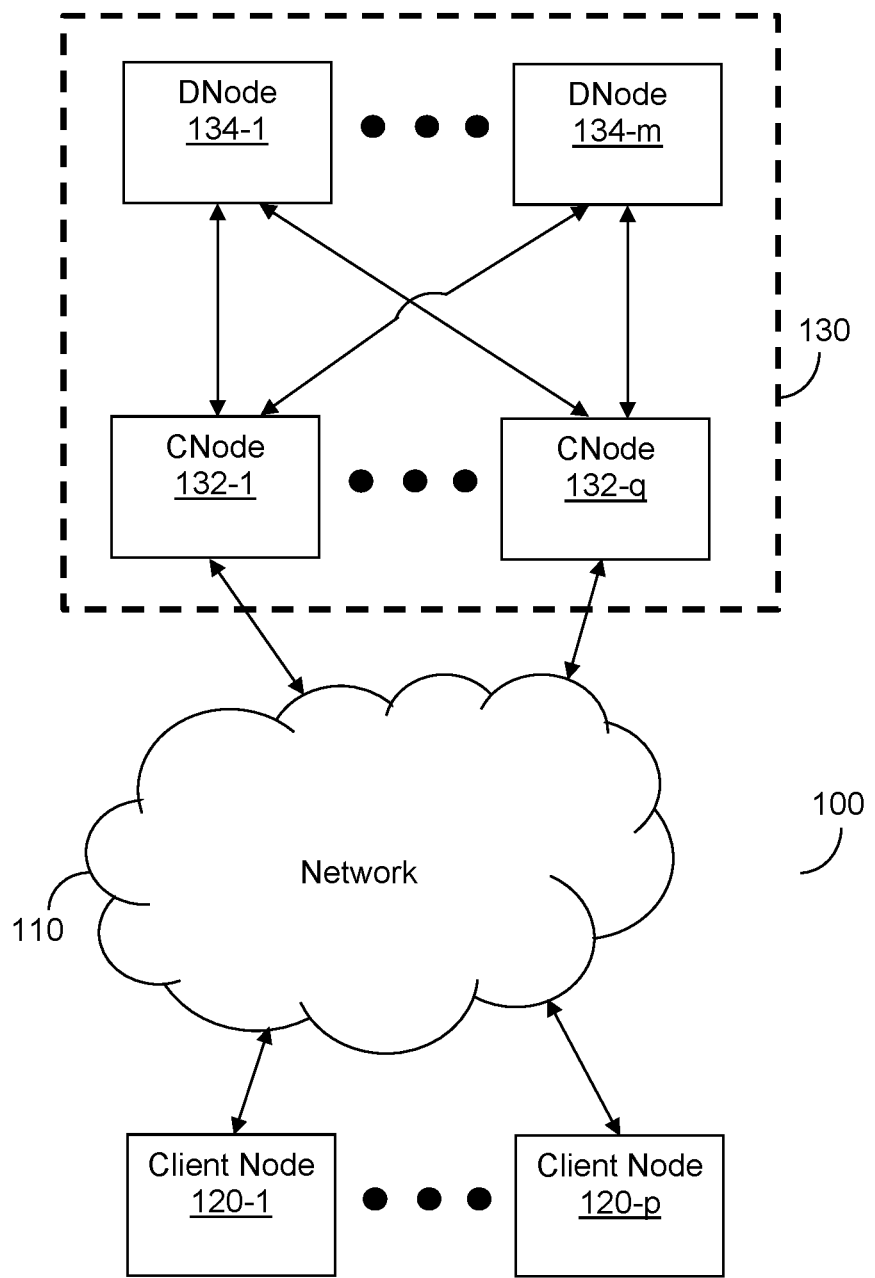
FIG. 1 is an example network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for using free space to improve erasure code locality. Given a systematic linear erasure code with r parity nodes and that there is free space of a user, the erasure code may be transformed into an improved erasure code using the free user space. The improved erasure code is a local code.

The systematic linear erasure code is implemented via stripes including chunks of erasure coding data. The chunks are portions of data distributed across non-volatile memory (NVM) nodes including systematic nodes storing systematic data and parity nodes storing parity data. The chunks may be arbitrarily selected, and do not necessarily need to be dedicated erasure coding data.

Each NVM node includes non-volatile memory such as, but not limited to, a disk. In an embodiment, a mapping is maintained between each stripe and the location of any free user data included in the stripe. The free user data is among free user space allocated or otherwise assigned to a user. The mapping is determined based on an erasure coding scheme. The mapping further indicates whether each stripe includes free user data. In a further embodiment, the erasure coding scheme is designed to reduce use of space or to provide optimal locality.

The disclosed embodiments allow for improving erasure codes using free space of users (also referred to as free user space). More specifically, the improved erasure codes do not require updating contents of the NVM nodes in which erasure coding data is stored and, therefore, allow for resuming use of the free user space shortly after rebuilding is complete. In some implementations, use of the free user space may resume immediately or almost immediately. Additionally, when not using the free space, the improved erasure code has the same error tolerance as it would when using the free user space. Further, the code locality (i.e., the number of NVM nodes that must be read in order to recover faulty data) is, on average, close to the theoretical optimum.

FIG. 1 is a network diagram 100 illustrating an example distributed storage system utilized to describe various disclosed embodiments. The network diagram 100 includes a distributed storage system 130, a network 110, and client nodes 120-1 through 120-p (referred to as a client node 120 or as client nodes 120 for simplicity).

The distributed storage system 130 includes compute nodes (CNodes) 132-1 through 132-q (referred to as a CNode 132 or as CNodes 132 for simplicity) and storage nodes (DNodes) 134-1 through 134-m (referred to as a DNode 134 or as DNodes 134 for simplicity). In an example implementation, the distributed storage system 130 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 include at least non-volatile memories (e.g., Flash, 3D Xpoint), and may be realized as combinations of volatile (e.g., RAM) and non-volatile memories. The non-volatile memories may be included in, for example, hard-disk drives (HDDs), solid state drives (SSDs), or a combination thereof. In an example implementation, each DNode 134 includes one or more drives containing disks (not shown) such that each DNode 134 includes one or more disks.

The CNodes 132 are configured to access data in the DNodes 134. In some implementations, the CNodes 132 may be configured to collectively act as a distributed transaction manager for accessing data in the DNodes 134. An example schematic diagram of a CNode 132 is described below with respect to FIG. 3.

The client node 120 is configured to send access commands to the distributed storage system 130 via the network 110. The CNodes 132 are configured to receive access commands from the client nodes 120 and to access the DNodes 134 based on the received commands. The access may include translating the received commands into a format supported by the DNodes 134. As a non-limiting example, NVM Express (NVMe) over Fabrics may be utilized to enable such access.

In an example implementation, each CNode 132 may access all DNodes 134. In a further example implementation, each CNode 132 is configured to read any data stored in any of the DNodes 134 and is configured to write data to one or more assigned portions of data stored in the DNodes 134.

In an embodiment, a CNode 132 is configured to store erasure coding data in the DNodes 134 according to an erasure coding scheme that uses free user data to improve locality of a systematic linear erasure code. To this end, the CNode 132 is assigned to one or more stripes of data in the DNodes 134 used for erasure coding (hereinafter "erasure coding stripes") and is configured to maintain a mapping of each of its erasure coding stripes to the location in the DNodes 134 of any free user data included in those stripes. Each CNode 132 may further maintain data indicating whether each of its assigned erasure coding stripes includes free user data. The mapping and indication data may be stored in the respective CNode 132 or in the DNodes 134.

In an embodiment, each CNode 132 is configured to allocate data using an erasure coding scheme that reduces use of space or optimizes the locality of its erasure code stripes. Data is distributed across non-volatile memory (NVM) nodes. Each NVM node is a unit of non-volatile memory and may be one of the DNodes 134 or a portion thereof. In an example implementation, each NVM node is a disk (not shown) in one of the DNodes 134.

Erasure coding data is split into chunks and stored across NVM nodes among the DNodes 134 via stripes such that each stripe includes chunks of data stored multiple NVM nodes. Each stripe is distributed across n total NVM nodes. To this end, for each stripe, its chunks of systematic data are distributed across k systematic nodes (each systematic node storing a chunk of the stripe's systematic data). Chunks of parity data are generated and distributed across r parity nodes to provide redundancy for the systematic data such that n−k=r.

The data is distributed according to an erasure coding scheme that may reduce use of space or provide optimal locality. For the following erasure coding schemes, it is assumed that at least some of the r parity nodes used for erasure coding (e.g., parity nodes of an existing systematic linear erasure code) are in the form of:

$$P_i = \sum_{j=1}^{k} a_i d_i \quad \text{Equation 1}$$

Here, $P_i$ is a parity node, k is the number of systematic nodes, $a_i$ is an optional element of a finite field, and $d_i$ is the content of NVM node i. More specifically, $d_i$ is a unit of user data (e.g., a user data block).

For the space-reducing mapping, the NVM nodes are stored in a stripe according to the following erasure code formula:

$$P_{ij} = \sum_{l=j}^{j(k-\frac{k}{t})/t} a_i d_i \quad \text{Equation 2}$$

In equation 2, $P_{ij}$ is one of the NVM nodes including free user data and t<n. To this end, for a desired locality of t+1 upon first failure (i.e., needing to read t+1 NVM nodes when the first NVM node fails) when using the space-reducing mapping formula, the NVM nodes include $$\frac{k}{t} - 1$$

extra NVM nodes. The value of t may be an arbitrary value that varies depending on the particular application. As a non-limiting example, when a locality of 50 is desired, the value of t is 49. NVM nodes having free user data may be used as these extra NVM nodes. To provide an average locality of $$t + 2 - 2 \Big/ \left(\frac{k}{t}\right),$$

the NVM nodes include $$\left(k - \frac{k}{t}\right) \Big/ t$$

extra nodes.

When recovering data from one of the NVM nodes including free user data, other NVM nodes having data in the same stripe as the free user data are read. Otherwise (e.g., when recovering data from a NVM node that does not include free user data), all NVM nodes having free user data are read and the data of the failed NVM node is removed from the parity nodes. This removal of the failed node data results in a new formula that has a locality of t nodes such that t−1 healthy (i.e., not failed) NVM nodes are read. Similar schemes may be utilized in the event of more than one failure.

For the optimized locality mapping, the nodes are stored in a stripe according to the following erasure code:

$$P_{ij} = \sum_{l=j}^{j(k)/t} a_i d_i \quad \text{Equation 3}$$

In equation 3, $P_{ij}$ is one of the NVM nodes including free user data and t<n. For the optimized locality mapping, $$\frac{k}{t}$$

extra nodes are needed. When recovering data from one of the NVM nodes including free user data, other NVM nodes having data in the same stripe as the free user data are read.

It should be noted that the embodiments described herein are not limited to the arrangement shown in FIG. 1. For example, storage systems to which the disclosed erasure coding techniques may be applied are not limited to the particular configuration of the distributed storage system 130. In particular, a storage system used for the improved erasure coding techniques described herein may utilize a single compute node for managing the multiple storage nodes without departing from the scope of the disclosure.

Figure 2:
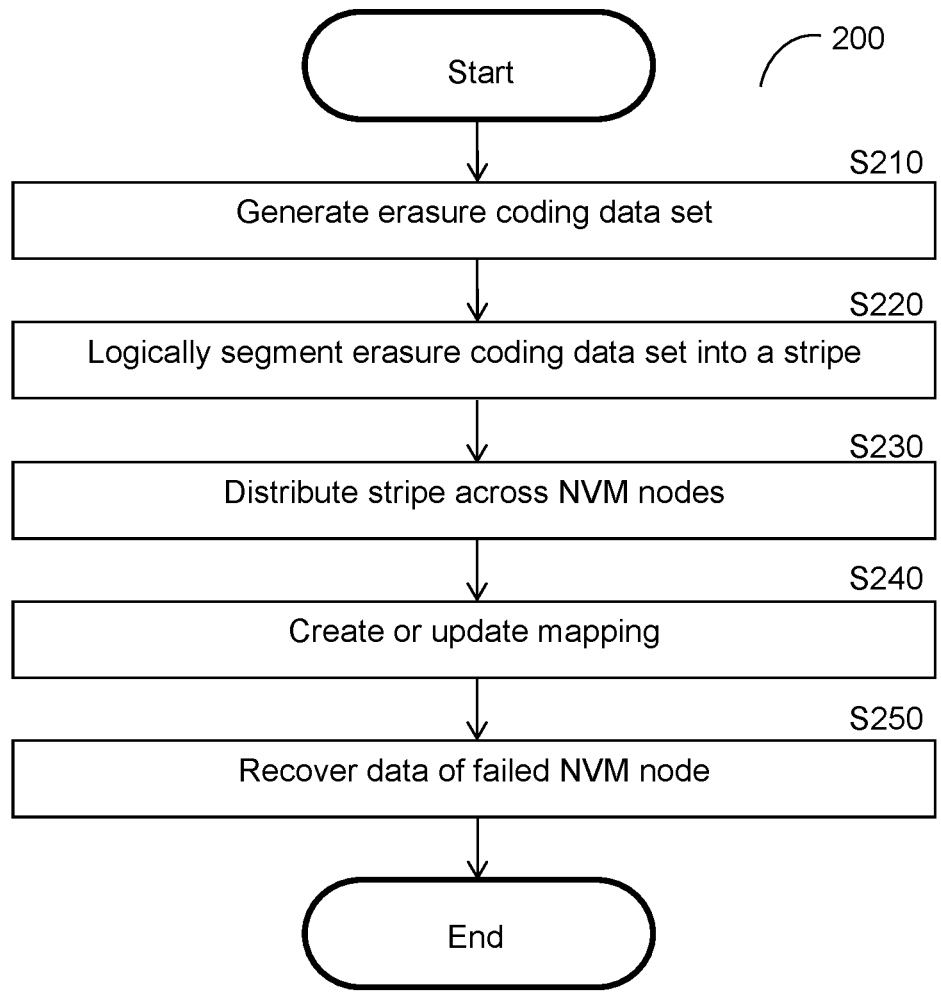
FIG. 2 is a flowchart illustrating a method for using free space to improve locality of an erasure code according to an embodiment.

FIG. 2 is an example flowchart illustrating a method for using free space to improve locality of an erasure code according to an embodiment. In an embodiment, each CNode 132, FIG. 1, may be configured to perform the method with respect to a corresponding set of stripes including erasure coding data and parity data.

At S210, an erasure coding data set is generated based on an existing data set to be protected by an improved erasure coding scheme. Generating the erasure coding data set may include, but is not limited to, adding parity data that is redundant with the existing data set.

At S220, the erasure coding data set is logically segmented into a stripe including chunks of systematic data and chunks of parity data based on an erasure coding scheme. The chunks of systematic data include portions of the existing data set. The erasure coding scheme utilizes free user space such that the stripe is distributed among one or more non-volatile memory (NVM) nodes storing the free user data. More specifically, the free user data is data used for the erasure coding data set that is available prior to erasure coding.

In an embodiment, the erasure coding scheme is an improved erasure coding scheme that uses the assumptions discussed above with respect to Equation 1. To this end, the improved erasure coding scheme may be a space-saving erasure coding scheme as discussed above with respect to Equation 2 or an optimal locality erasure coding scheme as discussed above with respect to Equation 3. The erasure coding scheme defines storage of the erasure coding data set with respect to a number of systematic nodes (i.e., a number of NVM nodes storing the chunks of systematic data) and desired locality. To this end, the erasure coding data set is logically segmented into a number of chunks based on the number of NVM nodes used by the erasure coding scheme (i.e., such that one chunk is stored per NVM node).

At S230, the stripe is distributed across multiple NVM nodes based on the erasure coding scheme. The stripe is distributed such that the stripe is distributed to a number of NVM nodes having free user space (i.e., storage space allocated, assigned or otherwise belonging to a user that is available prior to erasure coding). The number of NVM nodes having free user space in the stripe may be determined based on the desired locality as discussed above.

At S240, a mapping is created or updated based on the free user space included in the stripe. The mapping indicates a location of each portion of free user space included in the stripe. The mapping may further be between multiple stripes and locations of free user space. To this end, the mapping may further indicate whether each stripe includes free user data as well as the location of the free user data in each stripe including free user data. The mapping is utilized to determine which NVM nodes to read during recovery.

At S250, when one of the NVM nodes has failed, data of the failed NVM node is recovered based on the mapping.

When the erasure coding scheme is the reduced use of space scheme and the failed NVM node includes free user data, S250 may include reading the other NVM nodes including free user data in the same stripe. When the erasure coding scheme is the reduced use of space scheme and the failed NVM node does not include free user data, S250 may include reading all NVM nodes including free user data and removing the failed NVM node from any parity nodes. When the erasure coding scheme is the optimal locality scheme and the failed NVM node includes free user data, S250 may include reading the other NVM nodes including free user data in the same stripe. When the erasure coding scheme is the optimal locality scheme and the failed NVM node does not include free user data, S250 may include subtracting all of the free user data from the parity node, thereby resulting in a function with t elements that may be used.

Figure 3:
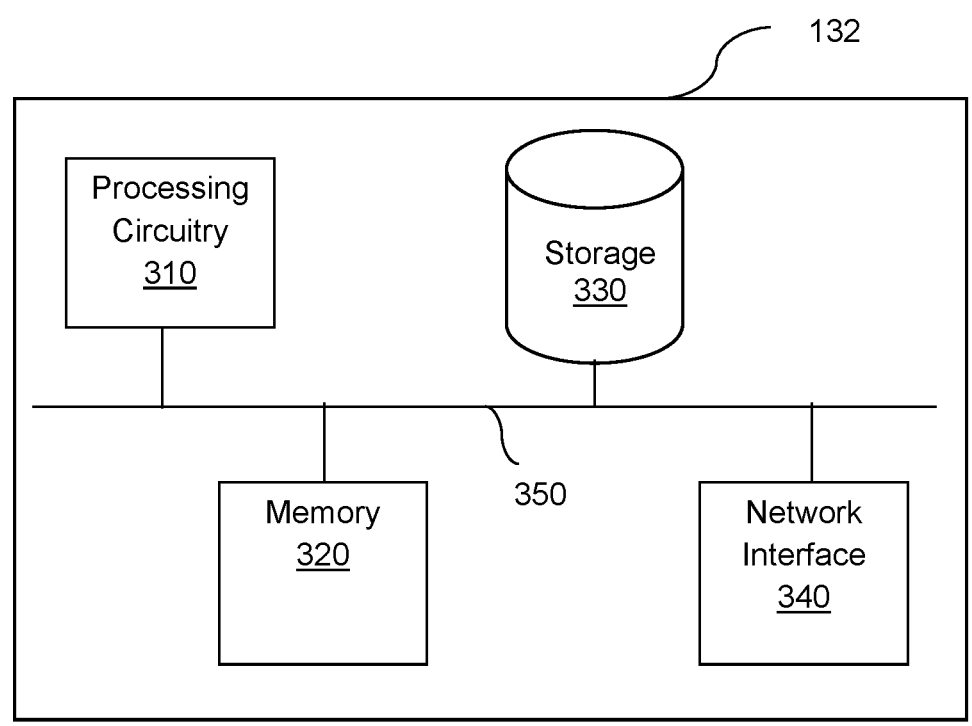
FIG. 3 is a schematic diagram of a compute node according to an embodiment.

FIG. 3 is an example schematic diagram of a CNode 132 according to an embodiment. The CNode 132 includes a processing circuitry 310 coupled to a memory 320, a storage 330, and a network interface 340. In an embodiment, the components of the CNode 132 may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 320 may be volatile (e.g., RAM, etc.), non-volatile (e.g., ROM, flash memory, NVRAM, etc.), or a combination thereof. In one configuration, computer readable instructions to implement one or more embodiments disclosed herein may be stored in the storage 330.

In another embodiment, the memory 320 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 310, cause the processing circuitry 310 to perform the various processes described herein.

The storage 330 may be magnetic storage, optical storage, and the like, and may be realized, for example, as flash memory or other memory technology, CD-ROM, Digital Versatile Disks (DVDs), or any other medium which can be used to store the desired information.

The network interface 340 allows the CNode 132 to receive access commands and send data over, for example, the network 110, FIG. 1.

It should be understood that the embodiments described herein are not limited to the specific architecture illustrated in FIG. 3, and other architectures may be equally used without departing from the scope of the disclosed embodiments.

It should be noted that various embodiments are discussed with respect to erasure code stripes distributed across nodes such as disks merely for simplicity purposes, but that other non-volatile memories or portions thereof may be equally utilized as nodes storing erasure coding data without departing from the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for using free space for recovering erasure coding data sets, comprising:
   segmenting at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data;
   wherein each chunk of the plurality of chunks of parity data is calculated by a summation function that is applied on a certain number of chunks of the plurality of chunks of systematic data, wherein the certain number is smaller than a number of a plurality of non-volatile memory nodes including the plurality of chunks of systematic data;
   distributing the at least one stripe across the plurality of non-volatile memory nodes based on the erasure coding scheme, wherein each non-volatile memory node is a unit of a non-volatile storage device; and
   upon a first failure of one of the non-volatile memory nodes:
      detecting that at least one of the non-volatile memory nodes that is not failed includes a first free space that does not currently store user data; and
      performing a first recovery process for recovering a first portion of the at least one erasure coding data set, based on the first free space.

2. The method of claim 1, further comprising:
   performing a second recovery process for recovering a second portion of the at least one erasure coding data set, when detecting a second free space in any of the non-volatile memory nodes that is not failed.

3. The method of claim 1, wherein the performing of the first recovery process includes storing the first portion in the first free space and mapping a stripe of the at least one stripe that is related to the first recovery process to the first free space.

4. The method of claim 1, wherein the performing of the first recovery process includes:
   reading chunks from at least one first non-volatile memory node of the plurality of non-volatile memory nodes that are not failed, wherein the first portion is recovered based on the reading, wherein a number of nodes included in the at least one first non-volatile memory node is smaller than a number of nodes of the plurality of non-volatile memory nodes.

5. The method of claim 1, wherein the performing of the first recovery process includes:
   reading chunks from at least one first non-volatile memory node of the plurality of non-volatile memory nodes that is not failed, wherein the first portion is recovered based on the reading, wherein a number of nodes included in the at least one first non-volatile memory node is equal to or smaller than k/t, wherein k is a number of the plurality of non-volatile memory nodes including the plurality of chunks of systematic data, wherein t is larger than 1 and is determined upon the first failure.

6. A non-transitory computer readable medium having stored thereon instructions for causing a processing circuitry to execute a process, the process comprising:
   segmenting at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data;
   wherein each chunk of the plurality of chunks of parity data is calculated by a summation function that is applied on a certain number of chunks of the plurality of chunks of systematic data, wherein the certain number is smaller than a number of a plurality of non-volatile memory nodes including the plurality of chunks of systematic data;
   distributing the at least one stripe across the plurality of non-volatile memory nodes based on the erasure coding scheme, wherein each non-volatile memory node is a unit of a non-volatile storage device; and
   upon a first failure of one of the non-volatile memory nodes:
      detecting that at least one of the non-volatile memory nodes that is not failed includes a first free space that does not currently store user data; and
      performing a first recovery process for recovering a first portion of the at least one erasure coding data set, based on the first free space.

7. A system using free space for recovering erasure coding data sets, comprising:
   a processing circuitry; and
   a memory, the memory containing instructions that, when executed by the processing circuitry, configure the system to:
   segment at least one erasure coding data set into at least one stripe based on an erasure coding scheme, wherein each erasure coding data set includes a plurality of chunks, wherein the plurality of chunks includes a plurality of chunks of systematic data and a plurality of chunks of parity data;
   wherein each chunk of the plurality of chunks of parity data is calculated by a summation function that is applied on a certain number of chunks of the plurality of chunks of systematic data, wherein the certain number is smaller than a number of a plurality of non-volatile memory nodes including the plurality of chunks of systematic data;
   distribute the at least one stripe across the plurality of non-volatile memory nodes based on the erasure coding scheme, wherein each non-volatile memory node is a unit of a non-volatile storage device; and
   upon a first failure of one of the non-volatile memory nodes:
      detect that at least one of the non-volatile memory nodes that is not failed includes a first free space that does not currently store user data; and
      perform a first recovery process for recovering a first portion of the at least one erasure coding data set, based on the first free space.

8. The system of claim 7, wherein the system is further configured to:
   perform a second recovery process for recovering a second portion of the at least one erasure coding data set, when detecting a second free space in any of the non-volatile memory nodes that is not failed.

9. The system of claim 7, wherein the system is further configured to store the first portion in the first free space and map a stripe of the at least one stripe that is related to the first recovery process to the first free space.

10. The system of claim 7, wherein the system is further configured to:
    read chunks from at least one first non-volatile memory node of the plurality of non-volatile memory nodes that are not failed, wherein the first portion is recovered based on the reading, wherein a number of nodes included in the at least one first non-volatile memory node is smaller than a number of nodes of the plurality of non-volatile memory nodes.

11. The system of claim 7, wherein the system is further configured to:
read chunks from at least one first non-volatile memory node of the plurality of non-volatile memory nodes that is not failed, wherein the first portion is recovered based on the reading, wherein a number of nodes included in the at least one first non-volatile memory node is equal to or smaller than k/t, wherein k is a number of the plurality of non-volatile memory nodes including the plurality of chunks of systematic data, wherein t is larger than 1 and is determined upon the first failure.

* * * * *